United States Patent
Demeter

[15] 3,696,334
[45] Oct. 3, 1972

[54] VEHICLE WARNING LAMP DEVICE

[72] Inventor: John C. Demeter, 14214 Moffett Drive, Fenton, Mich. 48430

[22] Filed: Oct. 8, 1970

[21] Appl. No.: 79,210

[52] U.S. Cl. ..................340/134, 340/84, 340/119, 340/87, 116/1, 240/7.55, 240/67, 240/90
[51] Int. Cl. ................................................B62j 8/04
[58] Field of Search............340/84, 87, 50, 100, 134; 240/8.1, 8.3, 7.55, 67, 90; 297/DIG. 9; 267/60 R, 61 R, 61 S; 343/711, 712, 713; 116/1, 62

[56] References Cited

UNITED STATES PATENTS

| | | | |
|---|---|---|---|
| 2,887,563 | 5/1959 | Kiekhaeffer | 340/87 |
| 3,487,359 | 12/1969 | McClintock | 340/50 |
| 3,493,739 | 2/1970 | Lipski | 240/8.3 |
| 2,586,643 | 2/1952 | Garlow | 240/8.1 A |
| 3,277,292 | 10/1966 | Horan | 240/90 |
| 3,362,758 | 1/1968 | Goerke et al. | 267/61 S |

FOREIGN PATENTS OR APPLICATIONS 1,016,585   11/1952   France.......................340/134

Primary Examiner—John W. Caldwell
Assistant Examiner—William M. Wannisky
Attorney—Andrew R. Basile

[57] ABSTRACT

A device for supporting a lamp adapted for use as a warning light on motorcycles and the like. The device has an L-shaped configuration with a horizontal leg adapted to be mounted adjacent the motorcycle seat and a vertical leg disposed rearwardly of the seat and extending upwardly to support the lamp and a backrest. The upwardly extending leg includes a pair of telescopically engaging tubular members which permit retraction and extension of the leg for adjusting the height of the lamp with respect to the motorcycle. The device includes means for mounting a taillight and directional signals.

10 Claims, 4 Drawing Figures

PATENTED OCT 3 1972　　　　　　　　　3,696,334

INVENTOR
JOHN C. DEMETER
BY
*Bruce Gifford & Patalidis*
Attorneys

VEHICLE WARNING LAMP DEVICE

BACKGROUND OF THE INVENTION

1. Field of the Invention

The present invention relates generally to supports and more particularly to an improved device for supporting a warning lamp adapted for vehicles such as motorcycles, bicycles and the like.

2. Description of the Prior Art

The prior art discloses a number of devices which may be used in conjunction with a vehicle to support a lamp emitting light which is visible as a warning to oncoming vehicles. The prior art devices are usually mounted in such a manner that they may be elevated to a considerable height so that the light may be seen from a distance, and further so that the light may be seen when other vehicles are between the observer and the vehicle carrying the warning lamp. A well known example of certain of the prior art lamps are commonly used on police cars, fire engines, ambulances and other various emergency vehicles.

Such emergency warning lamps, however, are not adaptable for use on private vehicles, as they detract from the appearance of the vehicle and further their use is normally limited by state laws to police and other similar emergency vehicles. In particular, such warning lamps are not adapted for use on motorcycles and similar vehicles because their design is not suitable for mounting on such motorcycles and the like.

Still other devices have been disclosed in the prior art which comprise a shaft having one end mounted to the exterior of an automobile with the elevated end having a lamp directed forwardly of the automobile, the lamp being used primarily as a fog light. Other devices have taken the form of a lamp support which is pivotally mounted to either the hood or trunk lid of an automobile and functions as a warning device. Such devices are normally stored under the hood or trunk lid of the automobile when their use is not required.

However, none of the prior art devices suggest a means for supporting a warning lamp on a motorcycle or similar vehicle which will function in a manner peculiar to such motorcycles and the like.

SUMMARY OF THE PRESENT INVENTION

The present invention which will be described subsequently in greater detail comprises an elongated rod mounted on a vehicle, such as a motorcycle or the like, in a position adjacent the vehicle seat for supporting a warning lamp at the elevated end of the rod. In one example of the invention, the rod is constructed of a tubular member having an L-shaped configuration including horizontal and vertical telescopically expandable legs which respectively permit adjustment of the shaft with respect to the seat, and relative adjustment of the height of the lamp with respect to the vehicle. A flexible tubing element is carried at the upper end of the vertical leg and supports the lamp in such a manner that the lamp will readily deflect if struck by an object. The lamp support includes a backrest adjustable relative to the rear of the vehicle seat such that the backrest is adaptable for use on vehicle seats of different lengths.

It is therefore an object of the present invention to provide a new and improved device for supporting a warning lamp which is particularly adaptable for use on motorcycles and similar vehicles.

Other objects, advantages, and applications of the present invention will become apparent to those skilled in the art of such warning lamps when the accompanying description is read.

BRIEF DESCRIPTION OF THE DRAWING

The description herein makes reference to the accompanying drawing wherein like reference numerals refer to like parts throughout the several views, and in which.

DESCRIPTION OF THE PREFERRED EMBODIMENT

Figure 1:
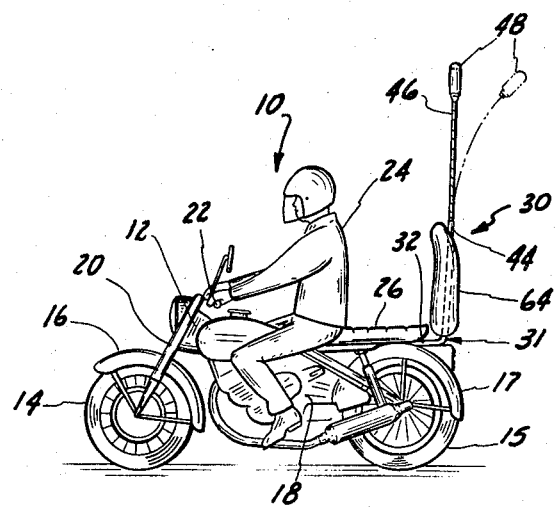
FIG. 1 is a perspective view of a motorcycle having a lamp supporting device constructed in accordance with the principals of the present invention.

In FIG. 1 there is illustrated a motorcycle 10, having a frame 12 with front and rear wheels 14 and 15 and their associated fenders 16 and 17, respectively. An internal combustion engine 18 is mounted in the center portion of the frame 12 and is operatively connected in the conventional manner to the rear wheel 15 to rotate the same and drive the motorcycle 10. The front wheel 14 is connected through a steering post 20 to steering bars 22, which are operated by the rider 24 in the conventional manner to steer the motorcycle 10. The rider 24 of the motorcycle 10 is seated on a seat 26 carried by the frame 12 and is generally located above the motor 18 and the rear fender 17, although the location, size, and configuration of the seat 26 may vary between motorcycles manufactured by different manufacturers.

Figure 2:
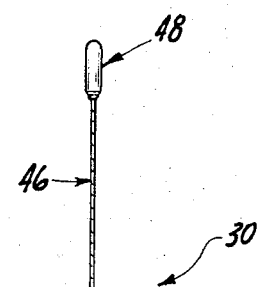
FIG. 2 is a fragmentary exploded view of the lamp supporting device illustrated in FIG. 1.

One example of the present invention is illustrated in FIGS. 1 and 2 as a warning lamp supporting device 30 comprising an L-shaped tubular rod 31 having a horizontal leg 32 and a vertical leg 34 preferably of a tubular construction. The horizontal leg 32 of the device 30 telescopically receives a mounting member 36 which, in turn, has a flange section 38 at its extended end which secures the leg 32 to the rear fender 17 by screws 40. The horizontal leg 32 may be attached to the underside of the seat 26 if desired. The telescopic engagement of the mounting member 36 with the horizontal leg 32 permits an initial adjustment of the supporting device 30 with respect to the seat 26 for a purpose to be described hereinafter. A set screw 42 extending through the leg 32 and into engagement with the mounting member 32 prevents relative movement between the two parts after the initial adjustment has been made.

The vertical leg 34 telescopically receives a support member 44, which, in turn, carries an elongated flexible rod 46 and a warning lamp 48. The telescopic engagement of the vertical leg 34 and the support member 44 permits an adjustment in the height of the lamp 48 with respect to the motorcycle 10, such that the light emitted from the warning lamp 48 may be seen from a distance and also the light emitted from the warning lamp 48 may be seen when other vehicles are between the observer and the motorcycle 10. A wing screw 49 extending through the leg 34 and into abutment with the support member 44 permits such height adjustment.

Figure 3:
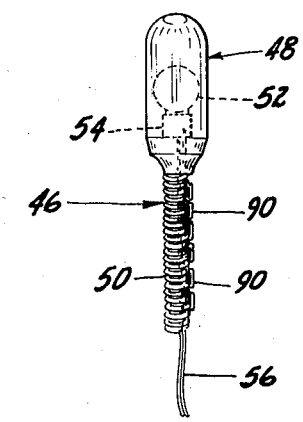
FIG. 3 is a fragmentary view of the lamp illustrated in FIGS. 1 and 2.

The flexible rod 46 may be constructed of a variety of materials such as plastic or metal, however, preferably it is constructed from a strong coil 50 (FIG. 3). The lamp 48, is mounted to the upper end of the coil spring 50 and is secured thereto by any suitable means such as an adhesive.

The lamp 48 may be of the flashing or revolving type and of any color limited only by the laws of the state in which the motorcycle 10 is to be operated. Preferably, the lamp 48 has a smooth outer contour and is constructed of a transparent colored material, such as a transparent plastic of sufficient strength so as not to break if the same comes into contact with a low-hanging object as the motorcycle 10 is being driven. The lamp 48 has a light bulb 52 mounted in a conventional socket 54 with suitable wiring 56 extending downwardly through the lamp supporting device 30 to an ignition switch (not shown) mounted on the steering bars 22 such that the lamp 48 is automatically turned on when the rider 24 starts the engine 18.

The vertical leg 34 has a pair of vertically spaced, parallel brackets 58 which are attached at their center portions 60 to the forward side of the leg 34 by any suitable means such as by welding at 62. The brackets 58 mount a backrest 64 and a directional signal housing 66 to the lamp supporting device 30 by screws 68 through aligned bores 70 in the housing 66 and the bracket 58 and into the back side of the backrest 64. As can best be seen in FIG. 2, the backrest 64 has a vertical recessed portion 72 within which the forward portion of the lamp supporting device 30 is positioned when attached to the backrest 64.

The directional signal housing 66 has conventional left and right hand signal lamps 74 and 76 respectively, which are provided with suitable electrical wiring 78 carried by the lamp supporting device 30 to connect the directional signal lamps 74 and 76 to a suitable switch (not shown) which, in turn, is mounted on the steering bars 22 and operated in the conventional manner.

The lamp supporting device 30 includes a brake and taillight assembly 80 comprising a housing 82 the top portion of which is attached to the horizontal leg 32 by any suitable means, such as an adhesive or the like, while the lower portion of the housing 82 has a contour mating with the rear fender 17. The light assembly housing 82 has a transparent end enclosure 84 through which a brake light lamp 86 and a taillight lamp 88 may be seen. The brake light lamp 86 and the taillight lamp 88 are respectively connected to the braking mechanism and a switch (not shown) on the steering bars 22 by suitable electrical wiring and functions in the conventional manner.

As hereinbefore indicated the spring coil 50 is provided to support the lamp 48 to prevent damage to the lamp 48 in the event the lamp supporting device 30 should strike a low-hanging stationary object, as for example, when the motorcycle 10 is used in a cross-country race where such low-hanging objects, such as tree limbs and the like, may be encountered. In such situations, it is desirable that the coil spring 50 be deflected rearwardly of the motorcycle 10 upon impact with such a stationary object. Once the stationary object has been passed, the coil spring 50, due to its resiliency, will return the lamp to a vertical position. However, due to the inertia of the coil spring 50, it may continue to swing forwardly of the backrest 64 and possible strike the head of the rider 24. To insure that the coil spring 50 will be deflected only rearwardly of a vertical position, a plurality of clips 90 (FIG. 3) are provided on the rearwardly facing side along the full longitudinal length of the coil spring 50. The clips 90 are attached to each successive coil of the coil spring 50 to prevent separation thereof, and thus, the coil spring 50 may be deflected rearwardly in a relatively easy manner as each successive coil on the forward facing side of the spring 50 is free to separate, whereas forward deflection of this coil spring 50 is restrained by the clips 90 since each clip 90 prevents separation of each successive coil. Thus, irrespective of how far rearwardly the coil spring 50 is deflected, after contact with a stationary object, the coil spring 50 and the lamp 48 will return to a normal vertical position without being deflected forwardly of the vertical position by any significant amount.

Figure 4:
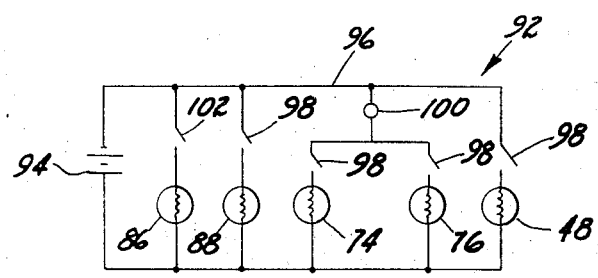
FIG. 4 is a wiring diagram of an electrical circuit which may be employed with the lamp supporting device illustrated in FIGS. 1 and 2.

Referring to FIG. 4, there is illustrated an example of an electrical circuit 92 which may be employed in conjunction with the present invention and which comprises a battery 94 electrically connected in parallel with the warning lamp 48, the directional signal lamps 74 and 76, the brake light lamps 86 and the taillight lamp 88, by suitable electrical wiring 96. The taillight lamp 88, the directional signal lamps 74 and 76, and the warning lamp 48 are connected in series with switches 98 which, as hereinbefore mentioned, are carried on the steering bars 22 such that the rider 24 may selectively use any of the lamps except the warning lamp 48 which is automatically turned on by the ignition switch. A conventional flasher unit 100 is connected in series with directional signal lamps 74 and 76 to cause the activated signal lamp to flash. The brake light lamp 86 is connected in series with a switch 102 that is operated by the braking mechanism of the motorcycle in a conventional manner.

It can thus be seen that the present invention has provided a warning lamp supporting device for motorcycles and other similar vehicles which is of a simple construction, inexpensive to manufacture and which provides safety features for the motorcycle rider which have heretofore been unavailable.

Although only one form of the present invention has been shown, it should be understood that other forms might be adopted, all coming within the spirit of the invention and the scope of the appended claims.

What is claimed is as follows:

1. A lamp supporting device for use on a vehicle such as a motorcycle or the like of the type having a seat accommodating a rider, said device comprising:

a rod having a lower portion mounted on said vehicle rearwardly of said vehicle seat, said rod extending vertically upwardly such that the upper portion of said rod extends above the head of said rider;

a backrest disposed adjacent the rear end of said vehicle seat;

means for attaching said backrest to the lower portion of said rod to support said backrest adjacent said rear end of said vehicle seat; and a warning lamp carried at the upper portion of said rod.

2. The device defined in claim 1 wherein a portion of said rod is constructed of a flexible material to permit said rod to be deflected.

3. The device defined in claim 1 wherein said rod further comprises a pair of telescopically engaging elements to permit said rod to be selectively vertically extended and retracted.

4. The device defined in claim 1 wherein the lower portion of said rod is adjustable relative to said vehicle seat to permit adjustment in the relative position of said backrest with respect to the rear of said vehicle seat.

5. The device defined in claim 4 wherein said lower portion of said rod is of L-shaped construction, one leg extending upwardly, the other leg extending in a generally horizontal direction, said other leg having a pair of telescopically engaging elements, one of said elements being attached to said vehicle, said elements permitting adjustment in the relative position of said one leg with respect to the rear of said vehicle seat; and said backrest being carried by said one leg.

6. The device defined in claim 5 further comprising a housing carried by said other leg and extending downwardly from said other leg, said housing enclosing a rearwardly facing lamp.

7. The device defined in claim 1 further comprising directional signals carried on the rearward facing side of said backseat; and means carried by said vehicle and electrically connected to said directional signals to selectively activate said directional signals.

8. A device for use on a vehicle of a type having a seat for accommodating a rider, said device comprising:

an elongated rod disposed rearwardly of said vehicle seat and having a lower portion adapted to be attached to said vehicle such that an upper portion of said rod extends upwardly above the head of said rider, said rod being normally disposed in a vertical position;

a backrest carried by said rod adjacent the rear of said vehicle seat;

a warning lamp carried by said upper portion of said rod;

an intermediate portion of said rod being constructed of a flexible material to permit said rod to be deflected in a rearward direction with respect to said vehicle, said intermediate portion of said rod being a closely wound, deflectable coil spring; and restraining means for preventing said rod from being deflected forwardly of said normal vertical position, said last mentioned means comprising a plurality of clips disposed on the rearwardly facing side of said coil spring, said clips being attached to each successive coil of said spring to permit said spring to be deflected rearwardly while restraining separation of said rearwardly facing coils to preclude forward deflection of said rod beyond said normal vertical position.

9. The device defined in claim 8 further comprising an electrical power source, and electrical conducting means carried by said rod connecting said warning lamp with said power source.

10. The device defined in claim 8 wherein said rod further comprises a pair of telescopically engaging elements to selectively permit vertical extension and retraction thereof.

* * * * *